Feb. 8, 1927.
R. D. MERSHON
1,617,163
MANUFACTURE OF ELECTRODES FOR ELECTROLYTIC APPARATUS
Filed Sept. 14, 1920     5 Sheets-Sheet 1
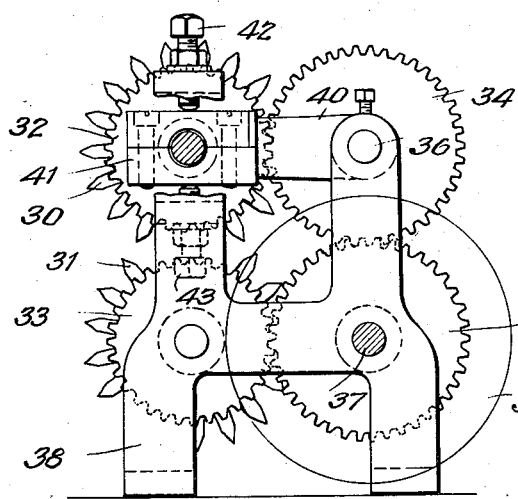
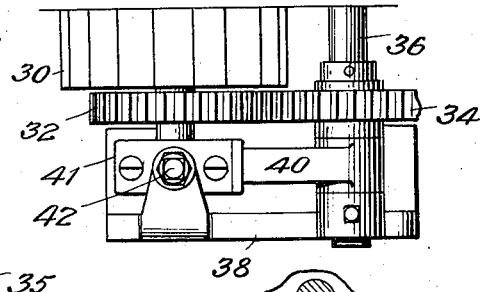
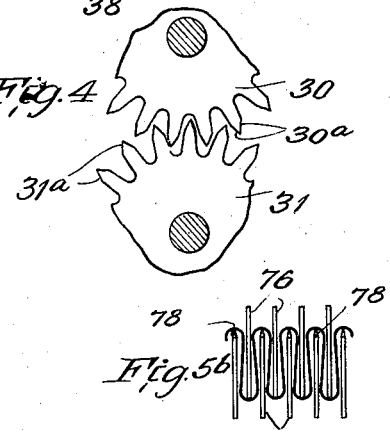
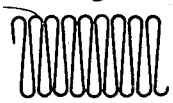
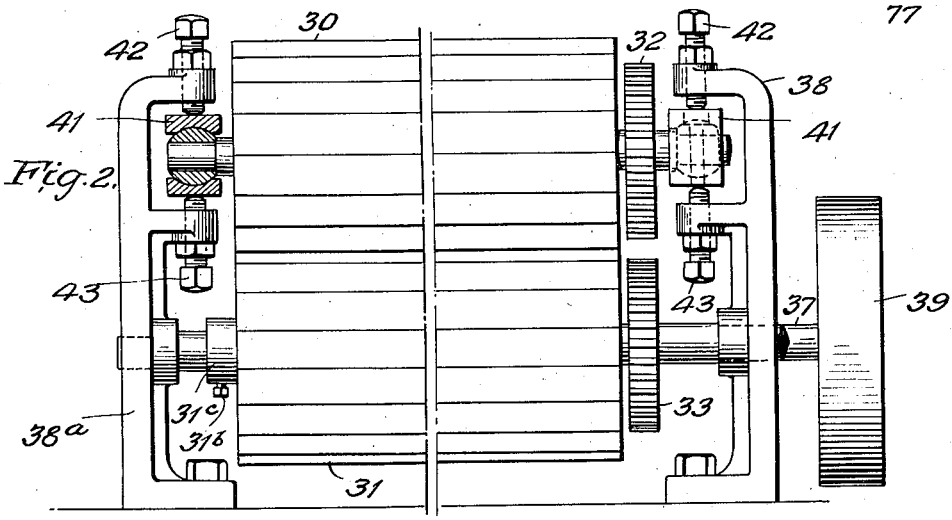
INVENTOR
R. D. Mershon
BY
Kerr, Page, Cooper & Hayward
ATTORNEYS

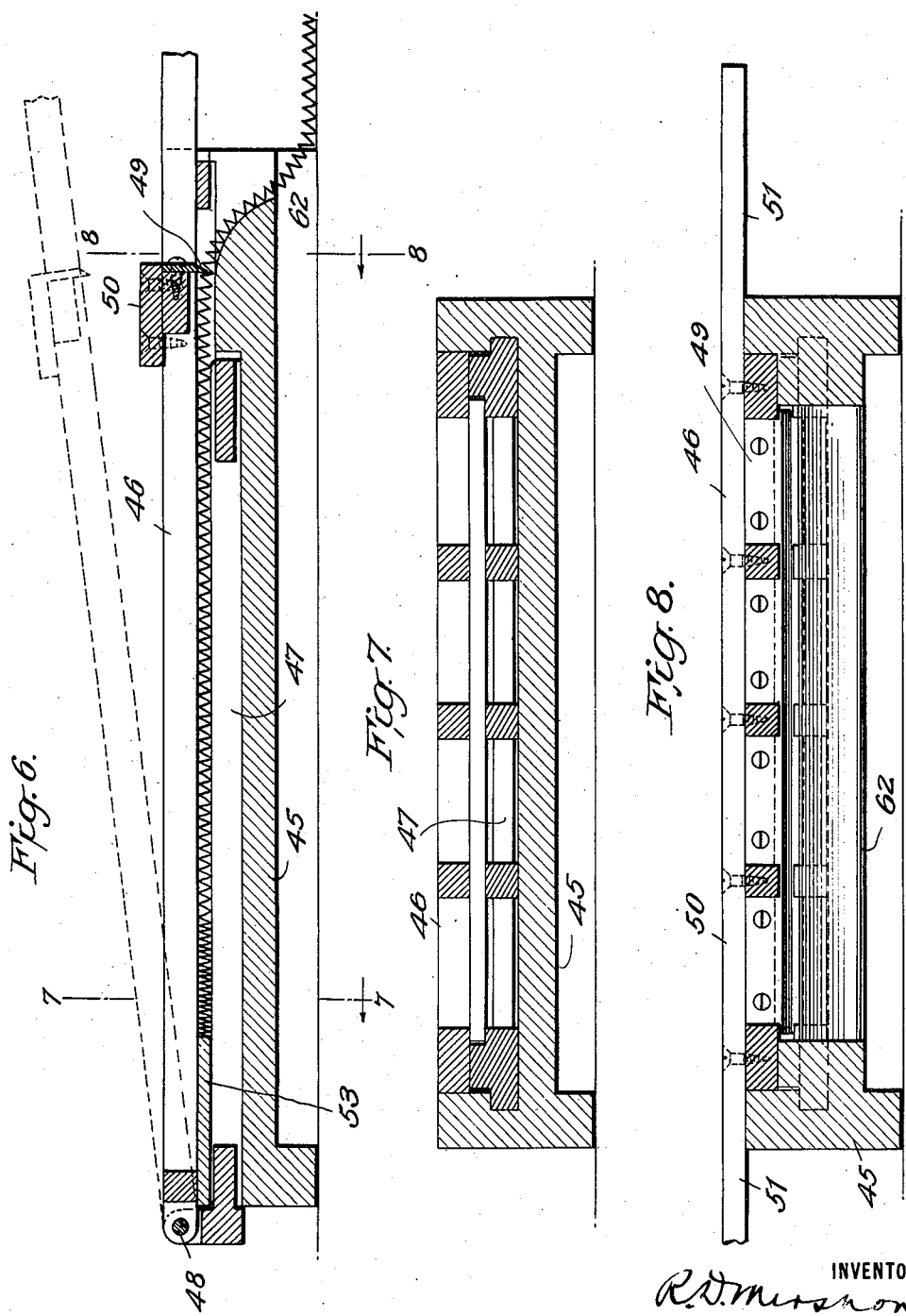

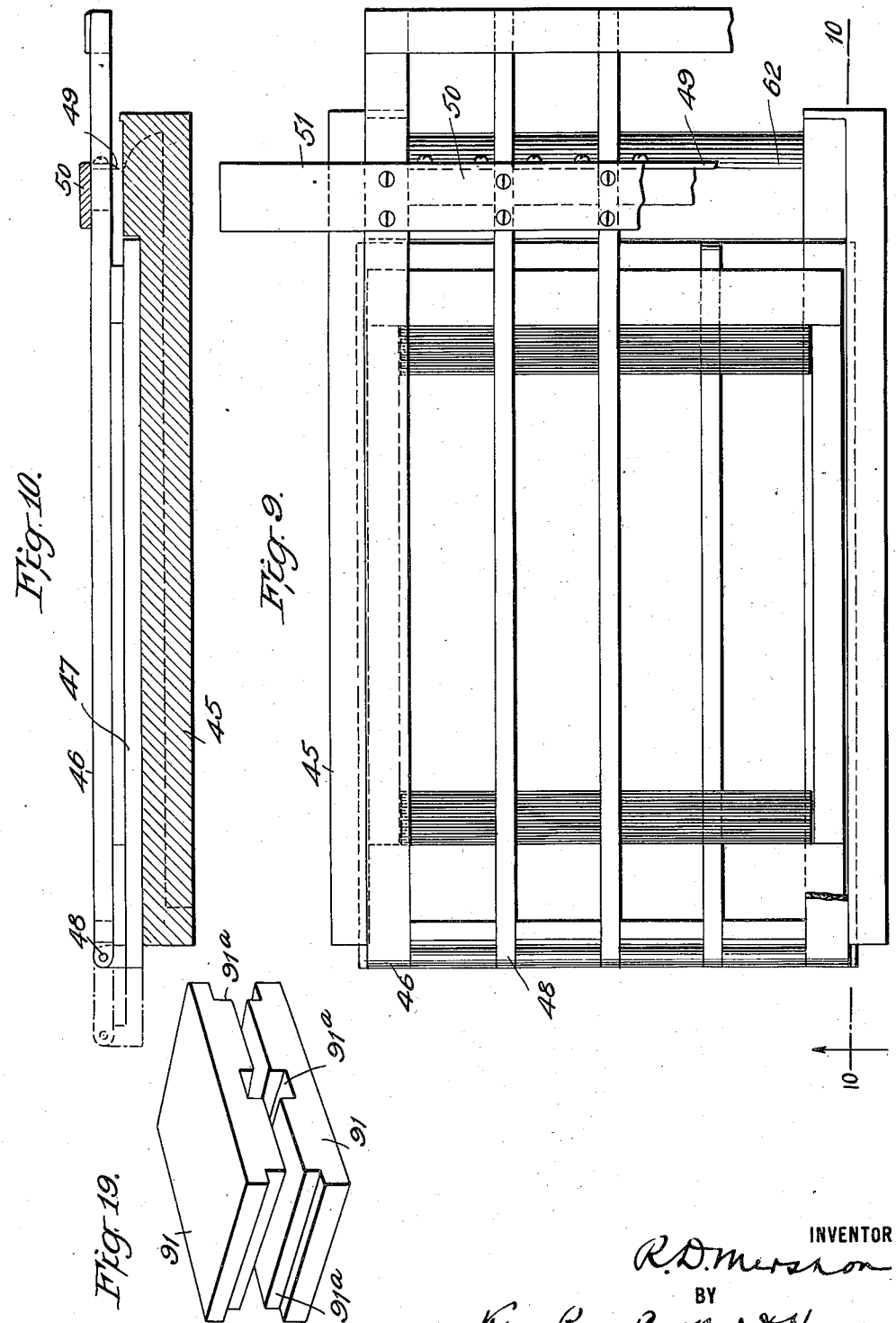

Feb. 8, 1927. 1,617,163
R. D. MERSHON
MANUFACTURE OF ELECTRODES FOR ELECTROLYTIC APPARATUS
Filed Sept. 14, 1920 5 Sheets-Sheet 4
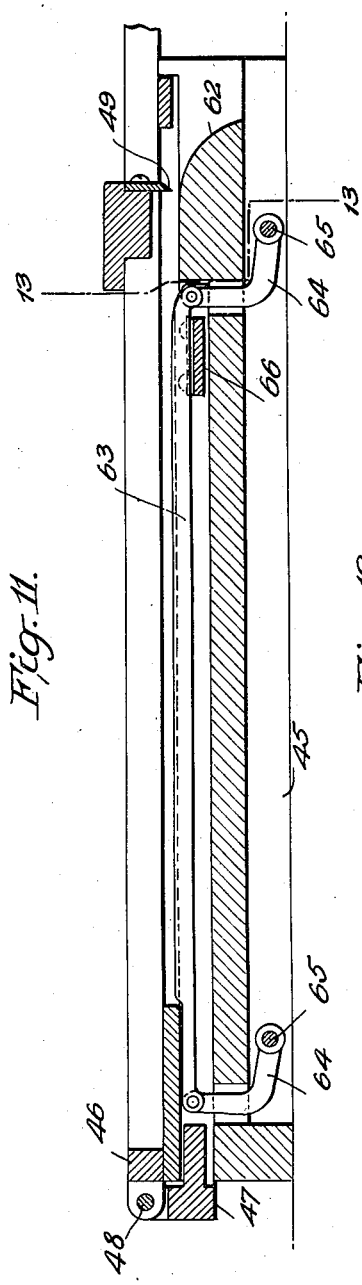
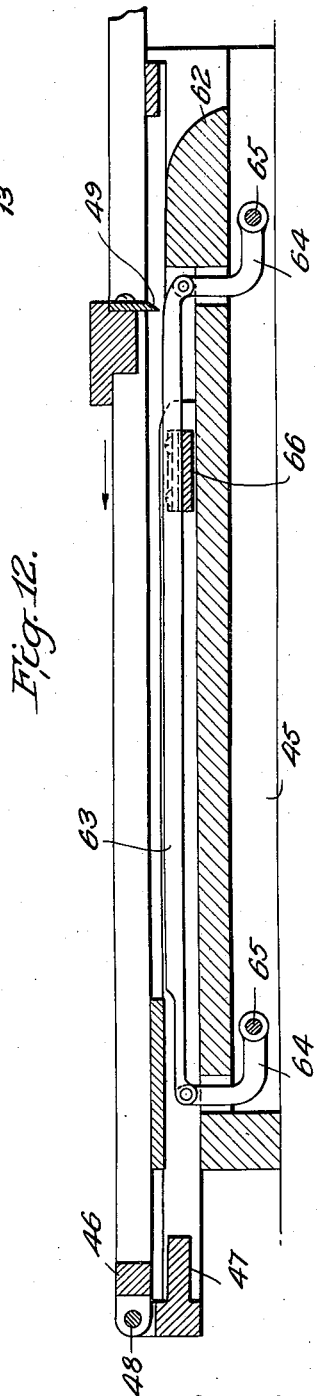
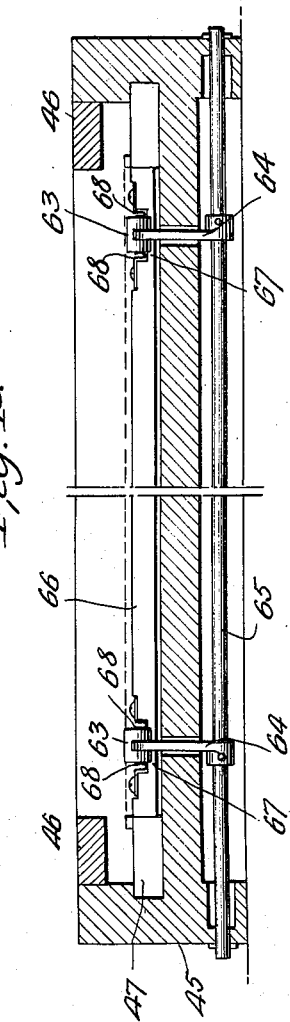
INVENTOR
R. D. Mershon
BY
Kerr, Page, Cooper & Hayward
ATTORNEYS

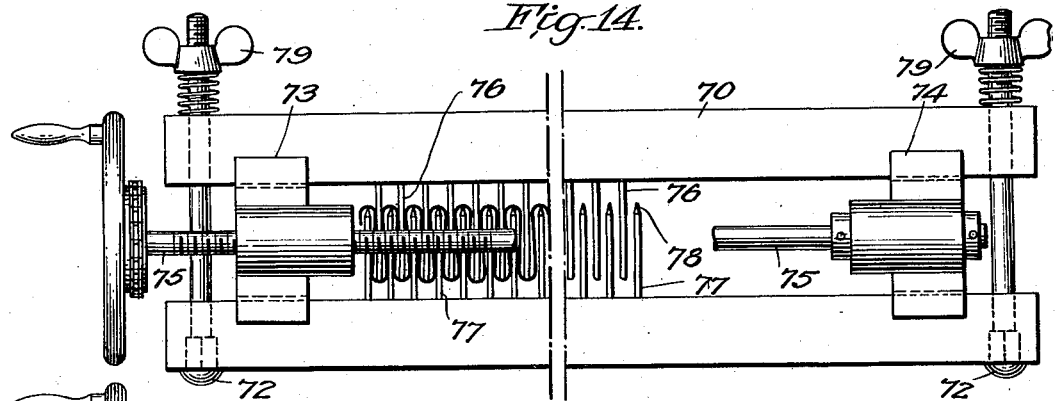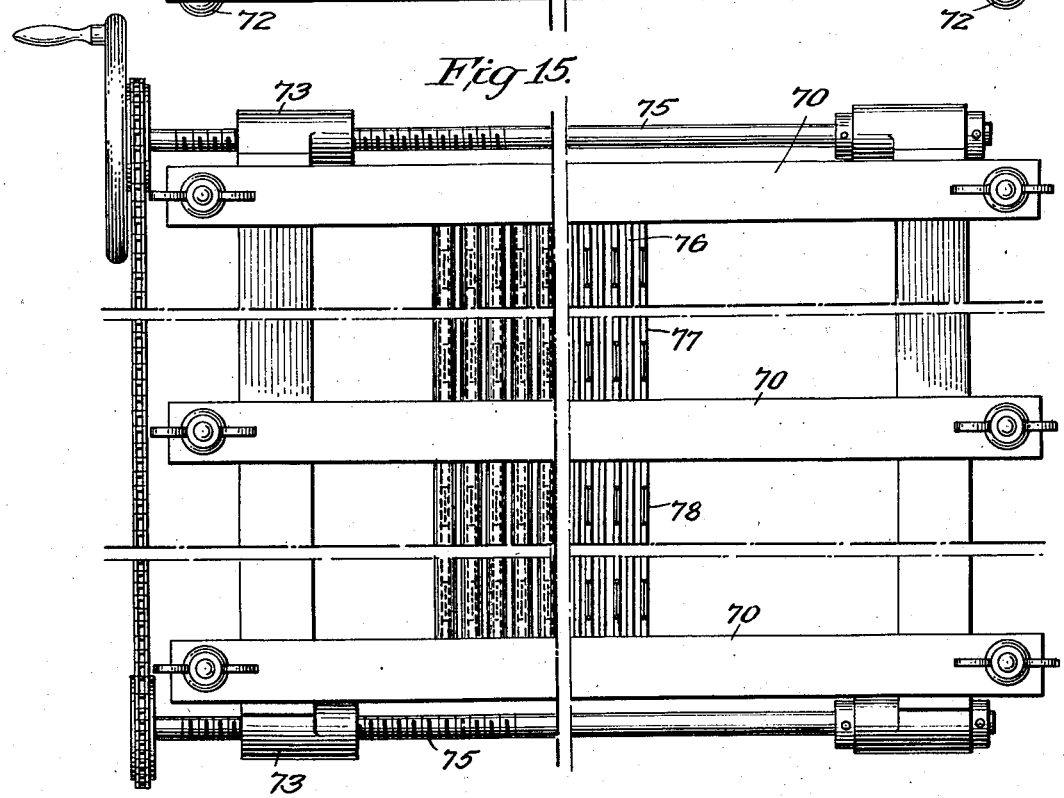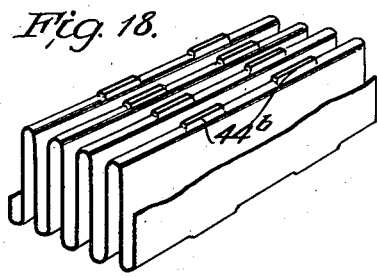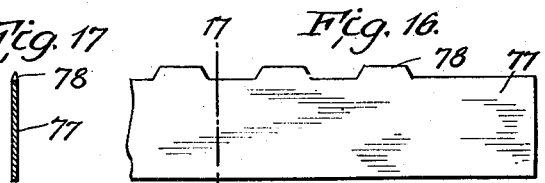

Patented Feb. 8, 1927.

1,617,163

UNITED STATES PATENT OFFICE.

RALPH D. MERSHON, OF NEW YORK, N. Y.

MANUFACTURE OF ELECTRODES FOR ELECTROLYTIC APPARATUS.

Application filed September 14, 1920. Serial No. 410,342.

In the use of electrolytic condensers, rectifiers and other apparatus employing metallic electrodes or elements immersed in the electrolyte, the efficiency of the apparatus depends, other things being equal, upon the amount of electrode surface exposed to the electrolyte; and it has therefore been proposed to make the electrodes of crimped or corrugated sheet metal, with a view of making the surface of the electrodes large in proportion to their bulk or the space occupied by them. My present invention is designed to produce electrodes of the general type but having more crimps or folds per unit of length than has heretofore been possible. Another object is to produce a crimped or folded plate with suitable perforations or apertures to reduce the resistance of the path of the charging current and to facilitate circulation of the electrolyte; the perforations being preferably at the angles or bends of the crimps, so as to minimize the tendency of bubbles to cling to these crevices by facilitating the tendency of the bubbles to detach themselves and rise to the surface.

It is in most cases highly desirable, and in some cases practically essential, that the metal at the start should be soft and pliable, preferably as soft as possible, in order to prevent cracking or splitting during the working up of the plate or sheet into the crimped form, and it is equally desirable that the metal of the finished plate be relatively hard and stiff so that it will stand up in use and permit handling without serious distortion. Accordingly I prefer to start with sheet aluminum which has been at least partially annealed and is therefore soft and workable, but at an appropriate stage of the process it is subjected to a hardening or tempering operation to give it the desired stiffness. Preferably this hardening or tempering is effected by stretching the metal transversely of the folds at an appropriate stage in the shaping of the folds, thus hardening the metal and giving it a permanent set in the form which it is desired that it should retain.

In the accompanying drawing, in which I have illustrated the preferred mode of practising the invention, Fig. 1 is a side elevation of a convenient and effective apparatus for effecting the preliminary crimping of the plate or sheet of metal.

Fig. 2 is a front elevation of the apparatus shown in Fig. 1.

Fig. 3 is a detail plan view of a portion of the apparatus shown in Fig. 1, illustrating a convenient mode of adjusting the crimping devices.

Fig. 4 is a detail end view, on a larger scale, of a portion of the cooperating crimping rollers.

Fig. 5 is a detail sectional view of a sheet or plate crimped by the apparatus illustrated in Figs. 1, 2, 3 and 4.

Fig. 5ª is a detail view showing the form taken by the crimps or folds after they have been compressed by the apparatus illustrated in Figs. 6 to 13 inclusive.

Fig. 5ᵇ is a detail section illustrating another step of the process.

Fig. 6 is a longitudinal vertical section of a convenient and effective apparatus for squeezing the corrugated plate, to bring the crimps closer together.

Figs. 7 and 8 are cross sections on line 7—7 and 8—8, respectively, of Fig. 6.

Fig. 9 is a plan view of the apparatus shown in Fig. 6.

Fig. 10 is a longitudinal section on line 10—10 of Fig. 9.

Fig. 11 is a longitudinal section similar to Fig. 6, illustrating a feature which may be employed to expedite the operation of the squeezing apparatus.

Fig. 12 is a section similar to Fig. 11, but showing certain parts in a different operative position.

Fig. 13 is a cross section on line 13—13 of Fig. 11.

Fig. 14 is a side view illustrating convenient apparatus for spacing apart the crimps of the plate after it has been squeezed or compressed.

Fig. 15 is a plan view of the apparatus shown in Fig. 14.

Fig. 16 is a side view of part of one of the spacing and perforating strips used in the apparatus shown in Figs. 14 and 15.

Fig. 17 is a section on line 17—17 of Fig. 16.

Fig. 18 is a perspective view of a portion of the crimped plate after it has been perforated.

Fig. 19 is a perspective view showing two blocks employed in the operation of stretching the metal after it is crimped and perforating the crimps or folds.

In making the electrode I take a sheet of soft aluminum, tantalum, magnesium, or other suitable metal, preferably the first mentioned, of suitable thickness and length, and give it a preliminary crimping so that it will have a cross section similar to Fig. 5.

The crimping referred to is preferably produced by running the plate of sheet metal between a pair of longitudinally ribbed or corrugated rolls, 30, 31, co-operating as indicated in Fig. 4. Preferably the ribs are spaced as shown, at their edges, the first faces 30a, 31a, being inclined about 60° to each other so as to give a corresponding bend to the plate. To insure proper spacing of the ribs at the point where they intermesh, so as to avoid distortion, tearing, or defective operation on the metal plate, the crimping rolls are not rotated one by the other through the medium of their intermeshing ribs, but are positively driven by spur gears which preferably have as little back-lash or lost motion as possible. In Fig. 1 the gears 32, 33, are provided on the journal of the crimping rolls. These gears do not mesh together, but mesh with gears 34, 35, on shafts 36, 37, journaled in the frames 38, 38a, in which the lower crimping roll is journaled. These gears 34, 35, intermesh as shown, and on the shaft 37 is a driving pulley 39. For the purpose of rotary adjustment, one of the rolls, for example the lower, is secured to its shaft by means of a set screw 31b working in the hub 31c.

For the purpose of adjusting or regulating the vertical separation of the crimping rolls 30, 31, the upper roll is carried in a pair of arms 40, pivotally mounted on the shaft 36 and provided at their free ends with ball-and-socket bearings 41 in which the upper crimping roll is journaled and which are arranged between the upper and lower adjusting screws, 42, 43. By means of these screws the spacing of the crimping rolls can be regulated with the greatest nicety and, at the same time, the ball-and-socket bearings permit the axis of the upper roll to be brought into accurate parallelism with the axis of the lower.

The plates having been passed between the crimping rolls 30, 31 and thereby brought to the form indicated in Fig. 5, they are subjected to a squeezing or collapsing operation, which brings them to a form substantially like that shown at 44 in Fig. 5a.

The squeezing or collapsing of the crimped plate, referred to above, is effected preferably by apparatus illustrated in Figs. 6 to 13 inclusive. This apparatus comprises, in general, a flat stationary frame 45, in which is arranged a longitudinally slidable frame formed of two leaves 46, 47, pivoted or hinged together at 48, at the forward end thereof. At the rear end, the upper leaf or frame 46 is provided with a downwardly extending transverse knife 49.

In using the apparatus just described the upper leaf or frame 46 is raised as indicated in dotted lines in Fig. 6, and the crimped plate or sheet of metal is placed on top of the lower frame 47, with the crimps running transversely, and the upper frame is lowered, thereby bringing the knife 49 down into a groove in the sheet or plate. The entire frame 46—47 is then slid forward (toward the left as seen in Fig. 6) with the result that a portion of the plate is squeezed or compressed against the stationary abutment 53, the crimps being brought close together as indicated in Fig. 6. The upper leaf is now raised to disengage the knife from the plate, and the entire frame 46—47 is slid back to initial position, after which the upper leaf is dropped and the frame pushed forward. In this way, by repeating the steps described, the entire plate is compressed to a compass which may be as small as one-eighteenth, or less, of its length before compression. For the purpose of actuating the slidable compressing or squeezing frame a bar 50 is arranged across the forward end, with its ends 51 extended to form handles. It will be observed that during the compressing movement of the blade 49 the crimped plate is between the upper and lower frames 46, 47, and hence cannot buckle or bulge.

As the sliding compressing frame is returned to initial position the lower member 47 tends to drag with it the compressed portion of the crimped plate and hence to slide the whole backward and off the inclined edge 62 of the supporting frame 45. To avoid such result the supporting frame or body 45 may be provided with suitable means to raise the plate wholly out of contact with the lower frame 47, so that the latter may slide freely under the plate. For this purpose I prefer to employ two or more longitudinal lifters 63 pivotally mounted at their front and rear ends on the upper ends of L-shaped arms 64, the lower ends of which are mounted on a pair of transverse rock shafts 65 journaled in the frame 45. At its rear end the frame 47 is provided with a cross member 66, notched at 67 to receive the lifters 63, and, in these notches, is equipped with spring fingers 68 bearing firmly on the side of the lifters. The initial position of the frame 46—47 is shown in Fig. 11, with the lifter-actuating member 66 at the extreme right. When the said frame is advanced to compress the crimped plate the member 66 is, of course, advanced also; and since it is connected to the lifters 63 by the frictional engagement of the spring fingers 68 therewith, the member 66 tends to push the lifters forward also. The lifters, however, are supported by the L-shaped arms 64, and hence the forward movement imparted to the lifters by the member 66 rocks the arms 64 counterclockwise (as seen in Fig. 11), thereby depressing the lifters to the position shown in Fig. 12. When the frame 46—47 and member 66 start back to initial position the reverse operation takes place; the lifters are raised to the position shown in Fig. 11, with their upper edges above the surface of the frame 47. In this manner the compressed plate is lifted and held above the lower compressing frame 47 during the homeward movement thereof.

When the crimped plate has been compressed as described, the crimps usually have the general form and arrangement shown at 44 in Fig. 5ª with their bends close to or in contact with each other. It is therefore necessary in most cases to give the plate an additional treatment, to space the crimps apart as shown in Fig. 18, and it is also desirable to perforate or slit the crimps at the bends thereof, as shown at 44ᵇ in the same figure. To effect these operations and at the same time harden the metal to the desired degree of stiffness the mechanism shown in Figs. 14 and 15 is provided.

The apparatus shown in Figs. 14 and 15 comprises upper and lower bars 70, 71, connected at the ends by bolts 72, on which the upper bars are vertically movable. Between the two sets of bars are two transverse bars 73, 74, grooved to receive the main members 70, 71, and permit the bars 73, 74 to be moved toward and from each other by means of the screw-rods 75.

The crimped plate having been compressed transversely of the folds as described, giving the latter the shape shown in Fig. 5ª, the bends are next flattened by lateral pressure to separate the folds from each other, at the same time giving the metal a set in the form indicated, for example, in Fig. 18. This is best done by pressing the folds upon rigid forming or shaping members, the thin metal strips 76, 77. The former, which are inserted in the upwardly open folds, as shown in Fig. 5ᵇ, have smooth lower edges, while the upper edges of strips 77, which are inserted in the downwardly open spaces, are formed with elongated teeth, as indicated at 78, Fig. 16. The plate is now placed between the two sets of bars 70, 71, Fig. 14, (removal of the wing-nuts 79 permitting the upper bars to be lifted off), and the bars 73, 74 are drawn together by means of the screw-rods 75 until the folds of the plate are flattened tightly against the sides of the strips. This gives the folds about the form shown in Fig. 18, the bends being flattened by the lateral pressure while the folds themselves are held apart by the spacing strips. Two flat blocks 91, Fig. 19, having grooves or recesses 91ª to receive the bars 70, 71, are now placed one upon the upper edges of the spacing strips 76 and the other under the strips 77. Pressure is now exerted upon the upper and lower blocks, as by resting the lower upon a solid surface and striking the upper block one or more smart blows of suitable force, thereby driving down the strips 76, which in turn draw the upper folds or bends down suddenly and firmly upon the teeth on the upper edges of strips 77, thus causing the teeth to puncture the metal, as shown at 44ᵇ, Fig. 18. At the same time the pressure of the edges of the strips upon the bends is preferably sufficient to produce a powerful stretching of the metal transversely of the folds. This may produce one or more of several desirable results. In the first place the stretching can be used to eliminate humps, bulges or other irregularities, thus making the bends straight and even. Such humps, bulges or other irregularities may be due to imperfections in the metal itself, as for example variations in thickness, or to irregularities or other imperfections in the tools used, or to other causes. It may be used to give the bends a "set", thereby eliminating or greatly diminishing the tendency of the bends to expand and thereby spread the folds farther apart when the pressure is released. And it may also be used to harden or stiffen the metal so that it will stand up in use and permit handling without serious distortion. The bars 70—71 are now opened, and the strips exchanged; or the plate is turned over, so that the unpunctured folds are now upward and resting on the teeth of the strips 77, after which the operations described are repeated, thereby perforating the remaining folds and again stretching the metal. In each case the stretching can be effected gradually, by repeated blows, using care not to strike with such force as to rupture the metal. The plate now appears about as shown in Fig. 18, with the sides of the folds or crimps substantially parallel and with elongated perforations or openings in the bends.

By the method described above, a strip of sheet aluminum eighteen feet long can be folded and compressed into a space of one foot, with the folds parallel and separated at all points. Even greater compression can be attained, for example, a strip twenty-four feet long being brought to the compass of one foot with folds only three-eighths of an inch deep. The degree of compression depends not only upon the depth of the folds, but also upon the thickness of the spacing strips 76, 77. These should not be too thin, as too great flattening of the bends at one operation may crack the metal. To avoid such results the flattening step can be repeated one or more times with successively thinner strips, the perforating being done with the last strips used. The last flattening operation or operations can be effected with the toothed strips 77 in the folds on both sides of the plates with the teeth 78 extending into all the apertures 44$^b$, so as to insure the apertures remaining open. Otherwise some of them may be closed by the extreme flattening of the folds.

The procedure described above can be successfully used with apparatus, especially the spacing and perforating strips, of only a fair degree of accuracy. With apparatus more accurately made, and especially if the perforating strips have their edges between the teeth nicely finished, preferably rounded, the untoothed strips need not be used, and toothed strips can be employed on both sides of the plate simultaneously, thus completing the operation without the necessity of turning the plate over or interchanging the strips.

It is to be understood that the invention is not limited to the specific procedure and apparatus herein illustrated and described, but may be practised in other ways without departure from its spirit.

I claim—

1. The method of producing a crimped or folded electrode of the type described, comprising crimping or folding a sheet or strip of sheet metal alternately back and forth to give the same a zig-zag cross section, compressing the crimped or folded sheet transversely of the folds to bring the latter closer together, subjecting the bends of the folds to lateral pressure while holding the folds themselves apart, and perforating the bends.

2. In a method of producing a crimped or folded sheet metal electrode of the type described, the steps comprising giving the plate a preliminary crimping to produce a zig-zag cross section; compressing the plate transversely of the folds to bring the latter closer together; inserting relatively thin spacing strips in the folds on both sides of the plate with their inner edges bearing upon the inner surfaces of the bends of the folds and their outer edges extending outwardly beyond the folds, and compressing the plate transversely of the folds and forcing the spacing strips inwardly whereby the metal is stretched over the inner edges of the spacing strips in close contact therewith and is given a set.

3. In a method of producing a crimped or folded sheet metal electrode of the type described, the steps comprising giving the plate a preliminary crimping to produce a zig-zag cross section; compressing the plate transversely of the folds to bring the folds closer together; inserting spacing strips in the folds on both sides of the plate with their inner edges bearing upon the inner surfaces of the bends and their outer edges extending outwardly beyond the folds; and forcing the spacing strips inwardly, whereby the metal is stretched over the inner edges of the strips and is given a set.

4. In a method of producing a crimped or folded electrode of the type described, the steps comprising inserting removable spacing strips between the folds of the plate, at least some of the strips being provided with cutting teeth on their inner edges; compressing the plate transversely of the folds whereby the latter are pressed against the spacing strips and the bends connecting the folds are decreased in size while the folds themselves are held apart; and forcing the teeth on the toothed strips through the contiguous bends to produce apertures in the latter.

5. In a method of producing a crimped or folded electrode of the type described, the steps comprising inserting between the folds on one side of the plate toothed spacing strips having cutting teeth on their inner edges, and untoothed spacing strips between the folds on the other side of the plate; compressing the plate transversely of the folds; and then forcing the teeth of the toothed strips through the contiguous bends.

6. In a method of producing a crimped or folded electrode of the type described, the steps comprising inserting between the folds on one side of the plate toothed spacing strips having cutting teeth on their inner edges, and untoothed spacing strips between the folds on the other side of the plate; compressing the plate transversely of the folds; forcing the teeth of the toothed strips through the contiguous bends, to produce apertures in the latter; releasing the pressure on the plate, exchanging the strips whereby the teeth on the toothed strips are brought into position to operate upon the unapertured bends; again compressing the plate transversely of the folds; and then forcing the teeth of the toothed strips through the bends contiguous thereto.

7. In a method of producing a crimped or folded sheet metal electrode of the type described, the steps comprising forming apertures in the bends connecting the folds inserting toothed spacing strips between the folds on both sides of the plate with their teeth extending into the apertures in the bends connecting the folds, and compressing the plate transversely of the folds to give the bends a final set.

8. In a method of producing a crimped or folded electrode of the type described, the steps comprising shaping a sheet of thin metal to corrugated form having parallel folds inserting, between the folds on both sides of the electrode, spacing strips which are deeper than the folds, and exerting pressure downwardly upon the upper strips while the lower strips are resting on a suitable surface, and thereby stretching the bends of the folds over the upper edges of the lower strips and the lower edges of the upper strips.

9. The method of producing a crimped or folded electrode of the type described, comprising crimping or folding a sheet or strip of sheet metal alternately back and forth to give the same a zig-zag cross section; inserting between the folds on one side of the plate spacing strips having cutting teeth on their inner edges, and untoothed spacing strips between the folds on the other side of the plate; compressing the plate transversely of the folds; forcing the teeth of the toothed strips through the contiguous bends, to produce apertures in the latter; releasing the pressure on the plate, and exchanging the strips whereby the teeth on the toothed strips are brought in position to operate upon the unapertured bends; again compressing the plate transversely of the folds; forcing the teeth of the toothed strips through the bends contiguous thereto; releasing the pressure on the plate; removing the untoothed strips and inserting in their place toothed strips with their teeth extending into the apertures in the contiguous bends; and compressing the plate transversely of the folds to give the bends a final set without narrowing the apertures therein.

10. In the art of producing a crimped or folded electrode of the type described, the improvement comprising crimping or folding a strip of soft sheet metal to produce crimps or folds therein, compressing the folds transversely of their bends to space the sides of the folds closer together while maintaining the sides of the folds separated, and stretching the metal transversely of the folds.

11. In the art of producing a crimped or folded electrode of the type and for the purpose described, the improvement comprising crimping or folding a strip of soft, pliable sheet aluminum to produce folds or crimps therein, and afterwards stretching the metal transversely of the folds.

12. In the art of producing a crimped or folded electrode of the type and for the purpose described, the improvement comprising crimping or folding a strip of soft, pliable sheet aluminum to produce folds or crimps therein, compressing the folds while maintaining the sides thereof apart, and stretching the metal transversely of the folds.

In testimony whereof I hereto affix my signature.

RALPH D. MERSHON.